July 19, 1938.    N. A. MACLEAN ET AL    2,124,073
DISPENSING APPARATUS
Filed Sept. 7, 1937    2 Sheets-Sheet 2
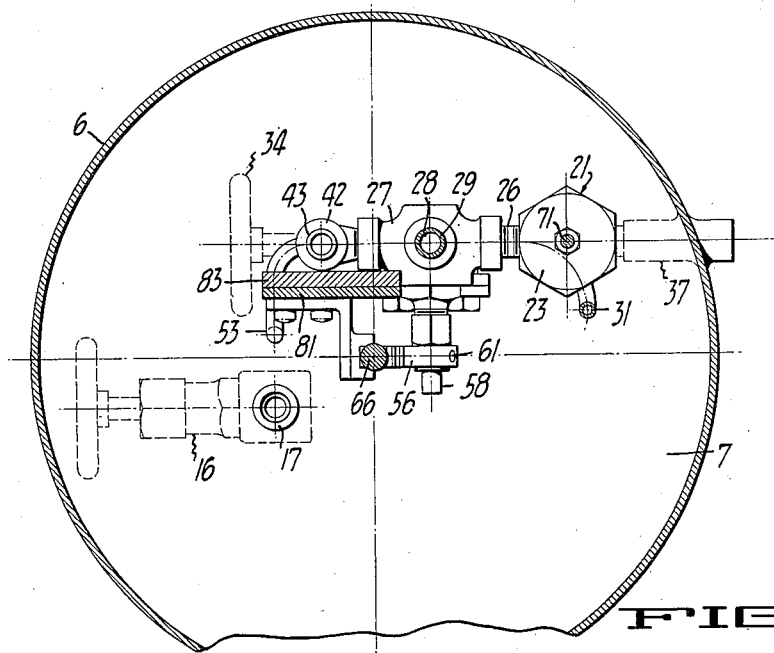
FIG_2_
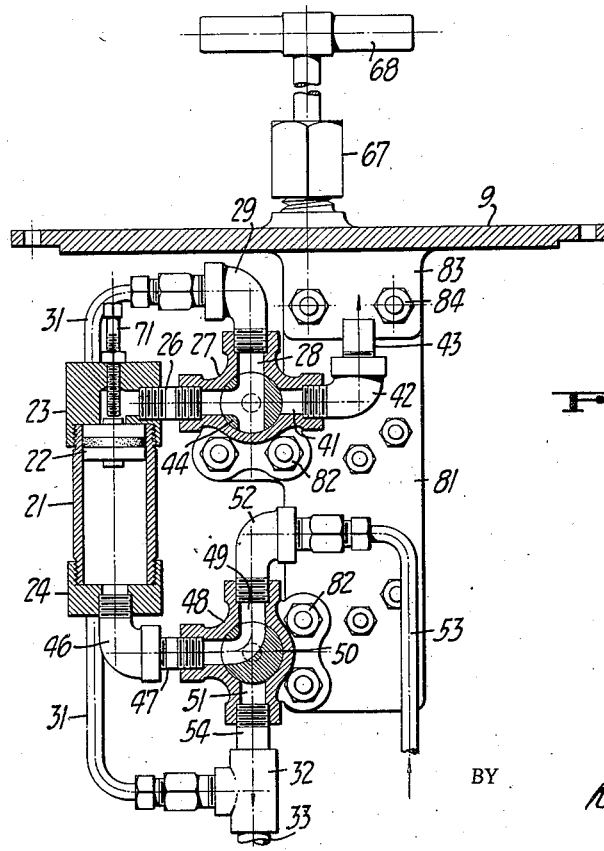
FIG_3_
INVENTOR.
NEIL A. MACLEAN
HUGH J. MACLEAN
BY Robert H. Eckhoff
ATTORNEY.

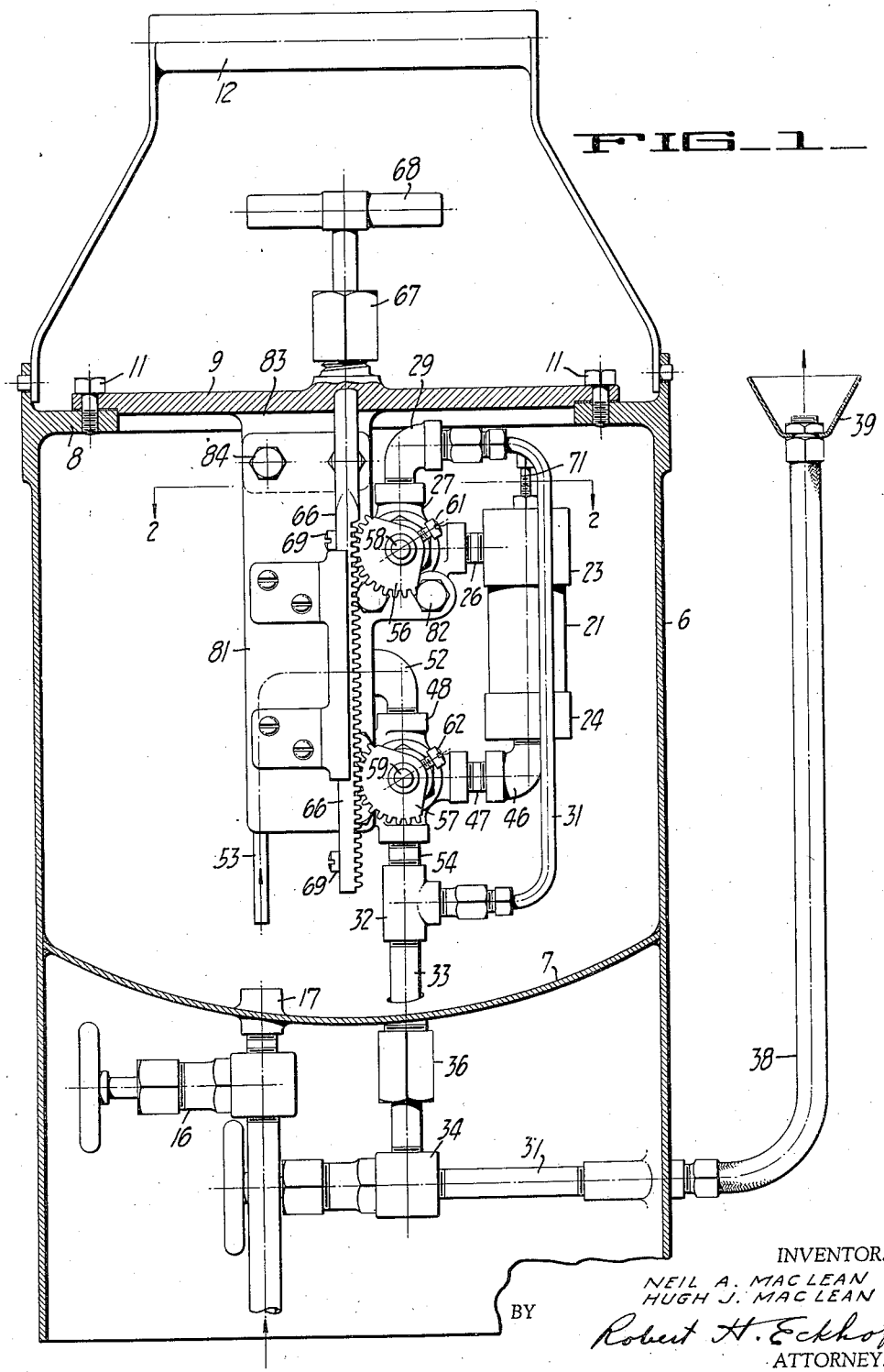

Patented July 19, 1938

2,124,073

UNITED STATES PATENT OFFICE 2,124,073

DISPENSING APPARATUS

Neil A. Maclean and Hugh John Maclean,
San Francisco, Calif.

Application September 7, 1937, Serial No. 162,677

3 Claims. (Cl. 221—102)

This invention relates to a liquid dispenser.

The invention will be particularly described in connection with the dispensing of such a liquid as methyl bromide. This is a useful insecticide and fungicide. It is also useful against rodents, and the present invention is particularly concerned with the provision of an apparatus for dispensing methyl bromide into the burrows of such rodents as ground squirrels.

In the dispensing of such a material as methyl bromide, a material toxic to humans, it is necessary that it be handled in such a manner that fumes cannot become dispersed into the atmosphere adjacent to the operator, to ensure protection of the operator. Further, because of the expensiveness of the material, it is necessary that the minimum effective dosage be provided.

It is in general the broad object of this invention to provide a suitable apparatus for accurate and safe dispensing of a fluid such as methyl bromide.

Another object of the invention is to provide a simple, inexpensive and readily operated liquid dispensing apparatus.

Another object of the present invention is to provide an apparatus for dispensing from a liquid source a plurality of charges of substantially equal volume.

The invention includes other objects and features of advantage, some of which, together with the foregoing, will appear hereinafter wherein the present preferred form of the invention is disclosed.

In the drawings, Figure 1 is a side elevation, partly in section, of the apparatus in position to dispense a measured charge.

Figure 2 is a section taken along line 2—2 of Figure 1 illustrating the relation of certain of the parts of the apparatus.

Figure 3 is a section taken through a portion of the dispensing apparatus in side elevation; the apparatus is shown in charge receiving and measuring position.

In the present form of the apparatus we provide a container 6 having a bottom 7 intermediate the ends thereof. A flange 8 is formed at one end of the container to provide a support on which circular plate 9 is positioned by cap screws 11. A suitable bail 12 is hinged upon the sides of the container so that an operator may readily carry the structure. The bottom 7 is placed intermediate the ends of the container so that certain of the operating mechanisms can be suitably protected, as will presently appear.

Plate 9 is secured to flange 8 in such a manner that the joint between the two is pressure tight because, with such a fluid as methyl bromide having a boiling point of about 4° C., the liquid in the container is under pressure in excess of atmospheric at ordinary atmospheric temperatures (about 70° F.). The liquid is introduced into the container through a valve 16 secured to a conduit 17 brazed into the bottom 7.

In accordance with this invention, means are provided for dispensing fluid within the container in accurately measured charges. In the present embodiment of our invention, this measuring means includes a cylinder 21 having a free-floating movable piston 22 therein. Upon each end of the cylinder are screwed members 23 and 24. Member 23 is suitably apertured and connected by a conduit 26 to a valve body 27. This valve includes an outlet 28 connected by a street L 29 to a conduit 31 which extends to T-fitting 32. One end of the T-fitting is connected by a conduit 3 to a valve 34 exterior of the container. Conduit 33 extends through a packing gland 36, in the base of the container, so that conduit 33 may be connected to T-fitting 32 for assembly purposes. Valve 34 is connected by a conduit 37 to a flexible line 38 provided to enable an operator to suitably place the charge to be dispensed. The flexible line 38 is a woven metal hose. A funnel 39 is secured at the end of the hose to prevent dirt and other foreign matter from packing and freezing about the end of the conduit.

The valve body 27 also includes an opening 41 connected to a street L 42 in which is also positioned a small length of conduit 43. The valve body includes a movable valve plug 44. This plug includes a suitable passage therein for connecting opening 28 with conduit 26 or opening 41 with conduit 26.

Adjacent the bottom of the cylinder street L 46 is screwed into the member 24 and is connected by conduit 47 to a valve body 48, carrying a valve plug 50. This valve body includes oppositely positioned openings 49 and 51. A street L 52 is inserted in the valve body to connect with passage 49 a conduit 53 leading to the bottom of the container to provide a liquid inlet. Opening 51 is connected by conduit 54 to one side of T 32.

Means are provided for operating the valve plugs in unison to connect selectively one side of the cylinder to the atmosphere while the other side of the cylinder is connected to the vapor space in the vessel 6 to admit gas under pressure and thus reciprocate piston 22. The operating means includes gear segments 56 and 57 carried upon stems 58 and 59 of valve plugs 44 and 50, and secured thereto by screws 61 and 62. The gear segments are engaged by a common operating rack 66, extending through a packing gland 67 in the plate 9 and carrying a handle 68. This rack is reciprocated over a vertical path limited by stops 69.

In that position in which the valves appear in Figure 3, handle 68 being raised, that side of the cylinder above the piston 22 is connected to the atmosphere, through the valve body 27, through street L 29 and conduit 31, T-fitting 32, valve 34 and lines 37 and 38. The lower side of the cylinder is connected to permit liquid in the container to enter through conduit 53 and street L 52, valve body 48 and the street L 46. Under this condition, a measured charge is admitted into the apparatus.

Upon rotation of valve plugs 44 and 50, by depressing the handle to the Figure 1 position, the liquid charge is measured and retained in the cylinder 21, street L 46, conduit 47 and a portion of the valve body 48. The extent of movement of piston 42 can of course be governed externally, and we have indicated a suitable adjusting screw 71 as extending outside of the casing to permit adjustment of the charge. This is suitably calibrated so that the operator can vary the charge.

Upon depressing the rack by means of handle 68 the gear segments 56 and 57 rotate and the plugs 44 and 50 are rotated counterclockwise 90° in Figure 3 to connect the upper portion of the cylinder with the gas space in the chamber, conduit 26 and passage 41 being then connected in valve body 27 and passage 51 being connected with conduit 47 so that the gas pressure in the container, in excess of atmospheric, is utilized to forcefully eject the fluid, through the line 38. If the discharge end of the hose, covered by funnel 39, is inserted into the burrow believed to be a rodent's habitation, the charge will be forcefully ejected into this.

The valve bodies 27 and 48 are secured to a plate 81 by bolts 82. Plate 81 depends from support 83 on plate 9 to which it is secured by bolts 84.

The present apparatus enables the extremely effective material, such as methyl bromide, to be accurately dispensed without danger of the operator being subjected to the fumes thereof. The present apparatus is simple, yet accurate and inexpensive.

We claim:

1. A liquid dispenser comprising a container normally having a liquid space and a gas space and under a pressure in excess of atmospheric, a cylinder, a movable piston therein, a first conduit extending from one cylinder end, a discharge pipe extending to a point distant from the container, a second conduit extending to said gas space, a third conduit extending from the other cylinder end, a fourth conduit extending to said liquid space, a first valve including an element movable selectively between a first position in which said first conduit is connected to said discharge pipe and to said second conduit and a second position in which said first conduit is connected to only said discharge pipe, and a second valve including an element movable selectively between a first position in which said third conduit is connected to said discharge pipe and a second position in which said third conduit is connected to said fourth conduit.

2. A liquid dispenser comprising a container normally having a liquid space and a gas space and under a pressure in excess of atmospheric, a cylinder, a movable piston therein, a first conduit extending from one cylinder end, a discharge pipe extending to a point distant from the container, a second conduit extending to said gas space, a third conduit extending from the other cylinder end, a fourth conduit extending to said liquid space, a first valve including an element movable selectively between a first position in which said first conduit is connected to said discharge pipe and to said second conduit and a second position in which said first conduit is connected to only said discharge pipe, a second valve including an element movable selectively between a first position in which said third conduit is connected to said discharge pipe and a second position in which said third conduit is connected to said fourth conduit, and means for moving said valves in unison so both valves are in either the first or the second position at the same time.

3. A liquid dispenser comprising a container normally having a liquid space and a gas space and under a pressure in excess of atmospheric, a cylinder, a movable piston therein, a first conduit extending from one cylinder end, a discharge pipe extending to a point distant from the container, a second conduit extending to said gas space, a third conduit extending from the other cylinder end, a fourth conduit extending to said liquid space, a first valve including an element movable selectively between a first position in which said first conduit is connected to said discharge pipe and to said second conduit and a second position in which said first conduit is connected to only said discharge pipe, a second valve including an element movable selectively between a first position in which said third conduit is connected to said discharge pipe and a second position in which said third conduit is connected to said fourth conduit, and means for moving said valves in unison so both valves are in either the first or the second position at the same time, said moving means including a rack in said container engaged with a gear segment on each of said movable valve elements and operating means for the rack.

NEIL A. MACLEAN.
HUGH JOHN MACLEAN.